United States Patent [19]
McGrath et al.

[11] 3,947,878
[45] Mar. 30, 1976

[54] SELF-CLOCKING NRZ RECORDING AND REPRODUCTION SYSTEM

[75] Inventors: Ronald P. McGrath, Livonia; William A. Bleher, Detroit, both of Mich.

[73] Assignee: General Instrument Corporation, New York, N.Y.

[22] Filed: Aug. 9, 1974

[21] Appl. No.: 495,994

Related U.S. Application Data

[62] Division of Ser. No. 235,583, March 17, 1972, Pat. No. 3,852,810.

[52] U.S. Cl. .................................................. 360/51
[51] Int. Cl.² ........................................... G11B 5/09
[58] Field of Search ........................... 360/45, 51, 48

[56] References Cited
UNITED STATES PATENTS

| | | | |
|---|---|---|---|
| 3,159,840 | 12/1964 | Woo | 360/45 |
| 3,488,662 | 1/1970 | Vallee | 360/45 |
| 3,503,059 | 3/1970 | Ambmoo | 360/45 |

Primary Examiner—Vincent P. Canney
Attorney, Agent, or Firm—Ellsworth R. Roston

[57] ABSTRACT

A magnetic recording and reading system wherein data is written into a magnetic medium in an NRZ code which is interrupted for the insertion of a guaranteed flux transition after each series of eight data cells. On readout, the guaranteed sync transition is used to generate a read clock for strobing purposes. The read clock is compensated to account for physical migration of the sync transition in the medium due to crowding effects or interaction with adjacent flux transitions.

14 Claims, 6 Drawing Figures

SELF-CLOCKING NRZ RECORDING AND REPRODUCTION SYSTEM

CROSS-REFERENCES TO RELATED APPLICATIONS

This is a divisional application of application Ser. No. 235,583, filed on Mar. 17, 1972, for SELF-CLOCKING NRZ RECORDING AND REPRODUCTION SYSTEM now U.S. Pat. No. 3,852,810.

INTRODUCTION

This invention relates to data recording and reproduction systems of the type using a bulk magnetic storage medium, such as a disc or a drum, and more particularly to the accurate synchorization of a read clock signal with the recorded data cells.

BACKGROUND

It is well known to those skilled in the magnetic recording systems art that two principal design objectives in any mass or bulk recording system are high data storage density and high data retrieval accuracy. Recording density is substantially a function of the physical proximity with which magnetic flux transitions can be placed in the bulk nagnetic medium whereas accuracy of readout involves, among other things, the establishment of an accurate timing signal so as to determine those points at which the read circuitry should be sensitized so as to observe a flux condition or a transition between flux conditions.

A number of data recording codes and systems have been developed to satisfy one or both of these basic design objectives in varying degrees. The highest density recording cam be achieved using a so-called non-return to zero (NRZ) code wherein all binary ZEROS are represented by one flux condition and all binary ONES are represented by another flux condition. While this code is efficient, it has the inherent disadvantage of requiring auxiliary clocking signals since a long string of data cells of one or the other value presents no flux transitions to develop clock pulses. Other recording codes have been worked out which are of lesser efficiency; that is, codes which require more than one flux transition per recorded data bit, but which are self-clocking in nature and, thus, eliminate some complexity in the timing system.

SUMMARY OF THE INVENTION

In accordance with the present invention, data is recorded according to an NRZ code which in itself is not self-clocking, but which presents a very high recording efficiency. Unlike the typical NRZ data train, the recorded code of the present invention is periodically interrupted by the insertion of a guaranteed flux transition which is employed for synchronization purposes. This transition is detected in a periodic fashion and employed to restart or resynchronize a data read clock which has the responsibility for periodically sensitizing or "strobing" the read system elements to detect the flux conditions in the medium and, thus, the values of the bit cells being read.

A particular feature of the present invention is the capability for compensating for time errors that might be introduced into the data read clock signal by a physical shift in the position of the guaranteed sync transition in the data train. As will be apparent to those skilled in the magnetic recording art, flux transitions in a bulk magnetic recording medium tend to influence one another when they occur very close together in the serially-arranged data track. Thus, to closely-spaced data transitions may shift away from one another.

With this in mind, the compensation technique of the present invention is accomplished by determining the flux transition pattern immediately surrounding the guaranteed sync transition in the data train and adjusting the position in time of the start of each read clock sequence in accordance with the transition pattern which is detected. Accordingly, a principal object of the present invention is to guard against a false start in the read clock sequence signal arising out of a shift in the sync transition under crowded transition conditions in the recording medium.

In accordance with a specific embodiment of the invention which is disclosed in detail hereinafter, data is recorded in a magnetic recording medium, such as a disc or drum, according to an NRZ code wherein data values are represented by first and second discrete flux conditions in the medium. Moreover, the data is recorded such that a guaranteed flux transition for synchronization purposes is inserted after every eight data bit cells. During readout, means are provided for detecting and storing sync transitions as well as the data transitions, if any, immediately surrounding the sync transition. In addition, means are provided for analyzing the pattern of transitions to determine whether an adjustment in the next read clock signal sequence is necessary and, if so, whether the adjustment should be one of advance or one of delay.

As will be hereinafter described in greater detail, the analysis and adjustment functions may be carried out by logic means to detect and decode the pattern of data bit cell transitions including and immediately surrounding the sync transition and introducing various delays between the occurrence of the sync transition and the restart or resynchronization of the pulse which establishes the next later occurring read-clock timing sequence. A first delay of one time-length is employed where the transition pattern indicates no need for compensation or adjustment; a second delay shorter in time-length than the first is introduced where the bit transition pattern indicates the need for adjustment by advance; and a third delay of loner time-length is introduced where the bit transition pattern indicates a need for adjustment by delay. In this fashion, the occurrence of the read clock signals is accurately positioned near the center of the data bit cells so as to obtain an average accuracy which is at least no worse than the equivalent of a single peak shift effect in the actual data pattern.

BRIEF DESCRIPTION OF THE DRAWINGS

The present invention as well as the various features and advantages thereof will be best understood from a reading of the following specification which describes in detail an illustrative embodiment of the invention. This specification is to be taken with the accompanying drawings of which:

Referring now to FIG. 1, there is shown a timing circuit 10 operative according to the signal pattern of FIG. 2 to interrupt a write data clock signal after each sequence of eight data bits for the purpose of inserting a guaranteed flux transition for synchronization purposes. The circuit of FIG. 1 has no direct bearing on the compensation function of the circuit of FIG. 3 other than to insert a guaranteed flux transition after every eight data bits this sync transition to be used for timing purposes. It will also be appreciated by those skilled in the art that the choice of inserting the sync transition after every eight data cells as opposed to some other number of data cells is at least in part one of convenience in the use of digital circuit components, and theoretically any other number might be employed, keeping in mind the basic objectives of high recording efficiency and accurate read timing. FIG. 1 is involved in both the write and read operations and, thus, it might be said that the circuit 10 is a hybrid device designed for standardization of circuit boards. It will be apparent, however, that where duplication of components is of low priority, the write portion of FIG. 1 may be constructed separately from the read portion of the system of FIG. 1 in a straightforward fashion.

In FIG. 1 a basic bit clock signal (BC) is applied by way of line 12 to NAND gate 14 and thence through NOR gate 16 to a nine-bit ring counter 18 which establishes the basic sequence count for the system hereinafter described. As will be apparent to those of ordinary skill in the art, the ring counter 18 is constructed using a conventional shift register having a feedback line. The timing signal $\overline{NBW}$ appears on line 20 from the output of the ring counter 18 and is applied to NAND gate 22 to delete a selected clock pulse to the data controller 24. The gated bit clock pulse is designed GWC in FIG. 1, the letters denoting a "gated write clock" signal. NRZ data is also applied to the controller 24 from a business machine or the like by way of input terminal 26. As indicated in FIG. 2, either the gated write clock GWC or its complement $\overline{GWC}$ may be used as a timing signal to the controller 24, the selection being made such that the gate signals arrive at gates 38 and 40 at the proper time. It will also be understood that the particular ring counter output $\overline{NBW}$ is also selected to achieve the proper timing at gates 38 and 40. In the present illustrated embodiment, the $\overline{NBW}$ signal is $\overline{7BW}$ because the propagation time of $\overline{GWC}$ through controller 24 is 2bit times. In other systems, other choices may be made.

Figure 2:
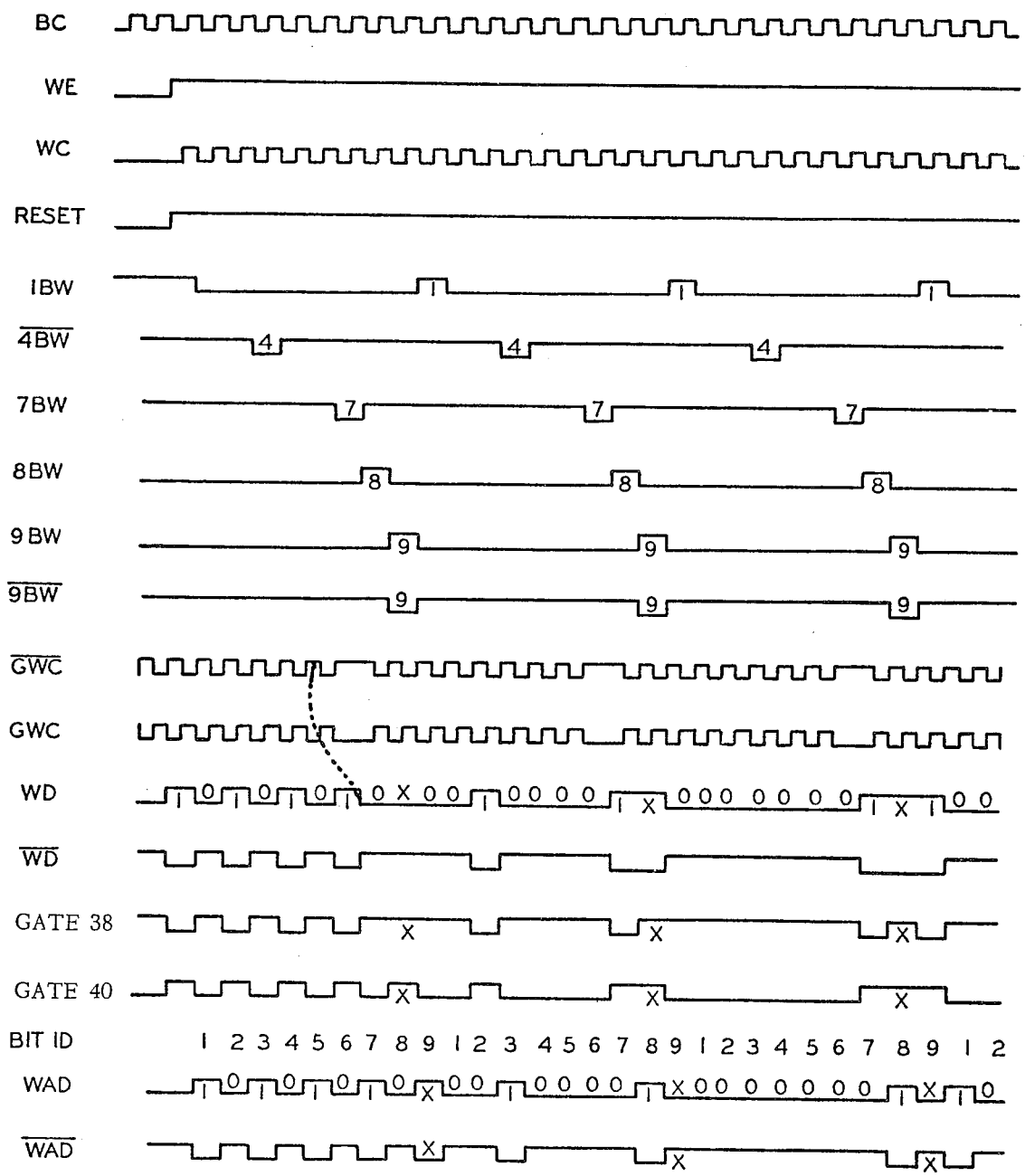
FIG. 2 is a timing diagram illustrating the operation of the circuit of FIG. 1 and having signal legends corresponding to those appearing in FIG. 1.

The bit clock signal on line 12 is also applied directly to a flip-flop 28 to time the basic toggling operation of the flip-flop 28. The complementary outputs WAD and $\overline{WAD}$ from the flip-flop 28 appear on lines 30 and 32 and, as shown in FIG. 2, WAD represents the signal to be written into the magnetic recording medium including the particular sequences of eight data bits spaced in each case by a guaranteed flux transition for synchronization purposes. The data cell containing the guaranteed transition is indicated in FIG. 2 by the letter "X".

Figure 1:
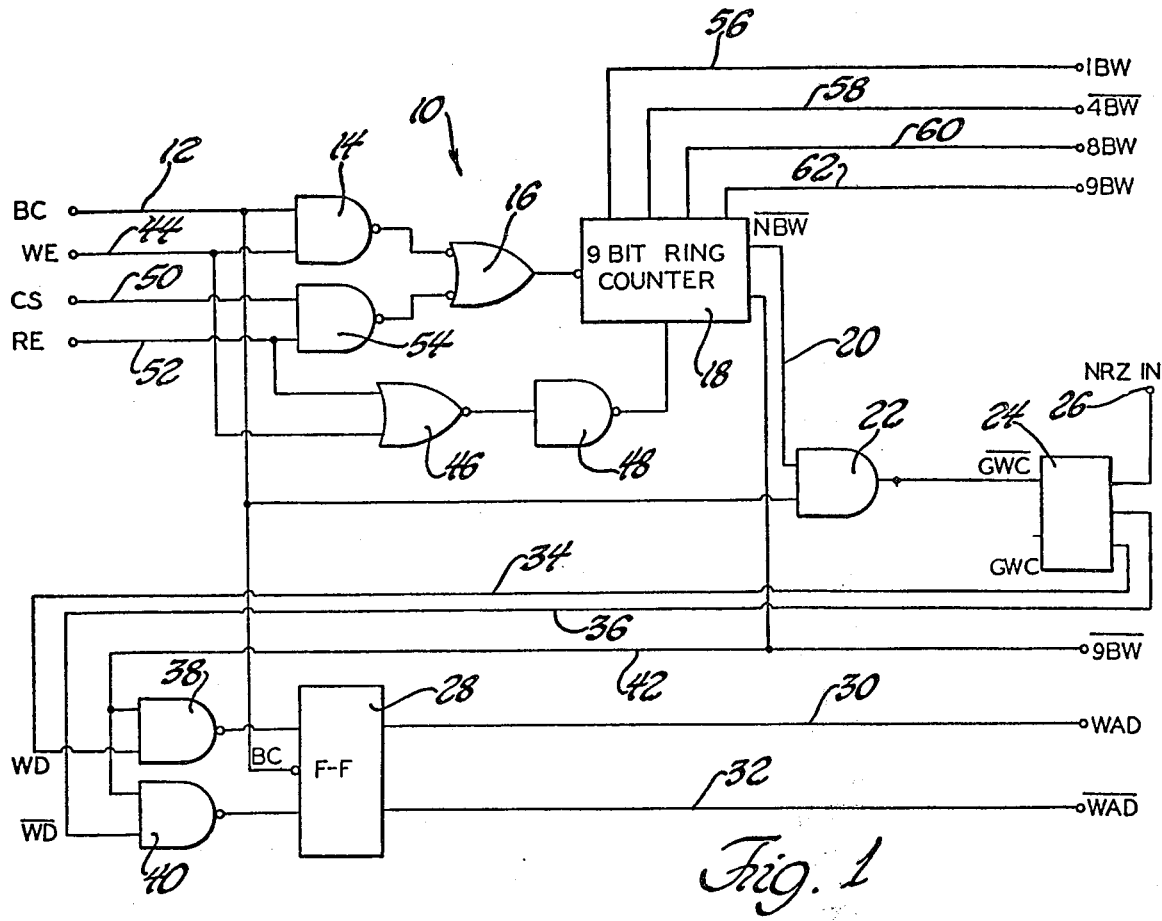
FIG. 1 is a schematic circuit diagram of a subsystem which provides certain basic timing signals during read and write operations and is constructed in accordance with the present invention.

The raw data is applied to flip-flop 28 by the controller 24 over lines 34 and 36, as shown in FIG. 1. Line 34 carrying the write data WD signal is applied to the flip-flop 28 by way of NAND gate 38 whereas the complement of the write data signal $\overline{WD}$ on line 36 is applied to the opposite input of the flip-flop 28 by way of NAND gate 40. The second signal to each of the NAND gates 38 and 40 appears on line 42 from the output of the ring counter 18 and represents the $\overline{9BW}$ negative going pulse every ninth bit cell as best shown in FIG. 2. The propagation time of the $\overline{GWC}$ signal through controller 24 is equal to 2bit times and thus the $\overline{WD}$ signals which are derived from the $\overline{GWC}$ signals arrive at the gates 38 and 40 at the same time as the $\overline{9BW}$ signal as explained above. Accordingly, the data to be written is applied in NRZ form to the flip-flop 28 at the frequency of the bit clock signal appearing on line 12, and controller 24 operating in the normal fashion to produce the time correlation between the bit clock and the data signals as will be apparent to those skilled in the art. The nine-bit ring counter 18 operates to interrupt the data bit train after each sequence of eight consecutive bits to insert the guaranteed sync transition. Regardless of which flux condition obtained during the eightbit cell in each eight-cell sequence, flip-flop 28 is toggled to the opposite flux condition for the guaranteed sync transition.

The write enable (WE) signal on line 44 is applied to NAND gate 14 to enable gate 14 during the write process and also to NOR gate 46 and the inverter 48 to reset the nine-bit ring counter 18 at the beginning of each write process.

During a read operation, the nine-bit ring counter is actuated by the CS and RE signals on lines 50 and 52 which are applied through NAND gate 54 and the NOR gate 16 to the input of the ring counter to shift the single bit in the circulating fashion just as the bit clock signal BC accomplishes that function during the write process. Lines 56, 58, 60, and 62 are also operative only during the read process andthe various signals identified by legend in FIGS. 1 and 2 on those lines are also applied to the circuit of FIG. 3 at the places indicated and for reasons to be hereinafter to be made apparent. The same is true for the $\overline{9BW}$ signal on line 42 which is also applied via line 128 to the read circuit of FIG. 3 as indicated in FIG. 1.

Figure 3A:
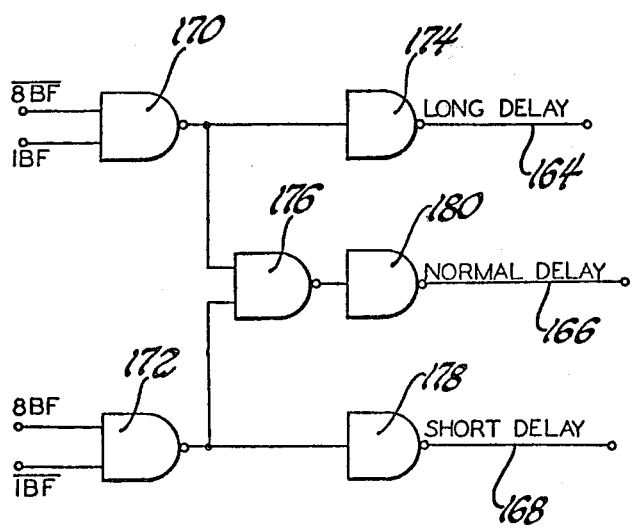
FIG. 3a is a detailed schematic diagram of a portion of the circuit of FIG. 3.
Figure 3:
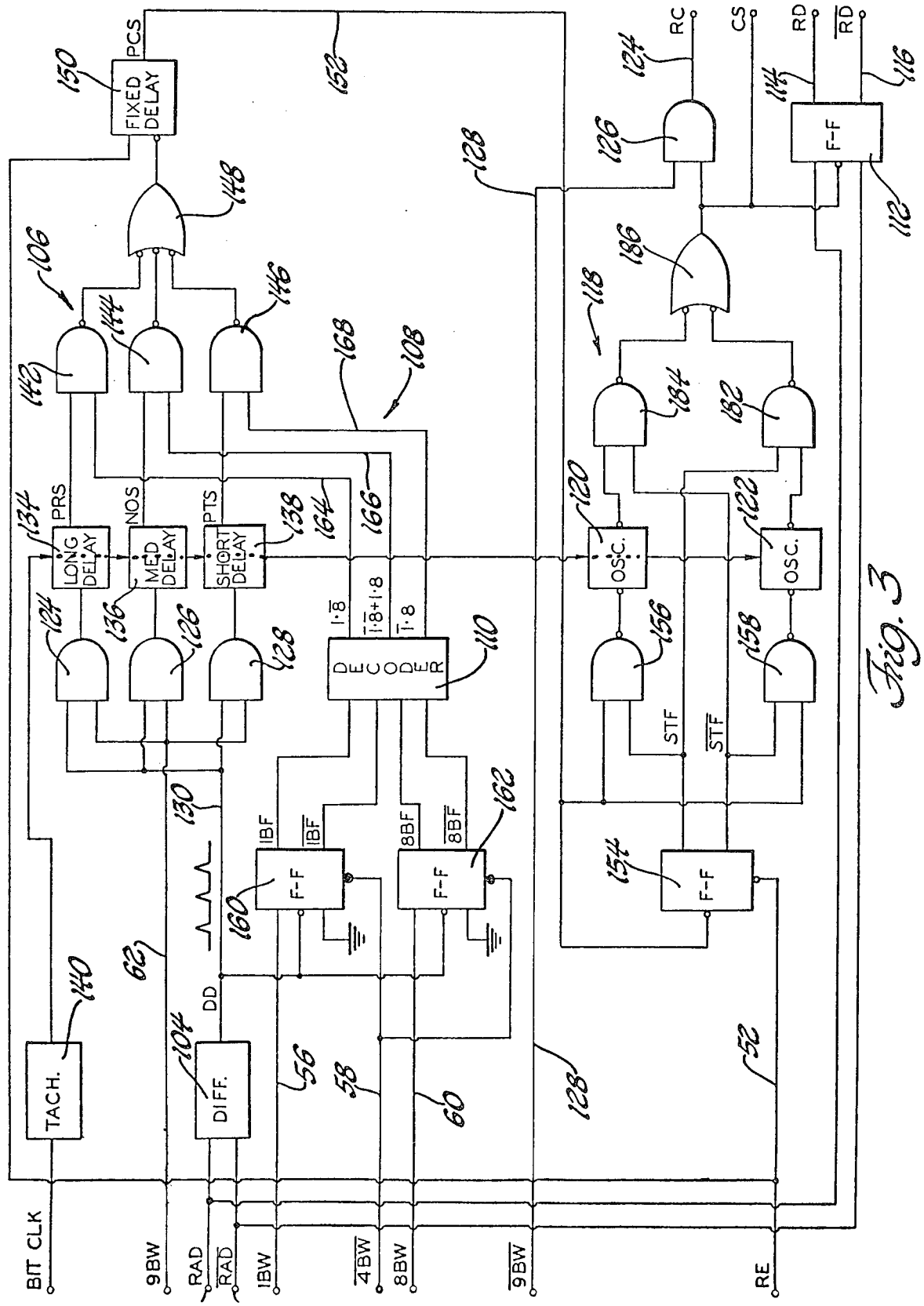
FIG. 3 is a schematic circuit diagram of a read system embodying the compensation technique of the present invention and adapted to operate on data recorded with the circuit of FIG. 1.
Figure 4:
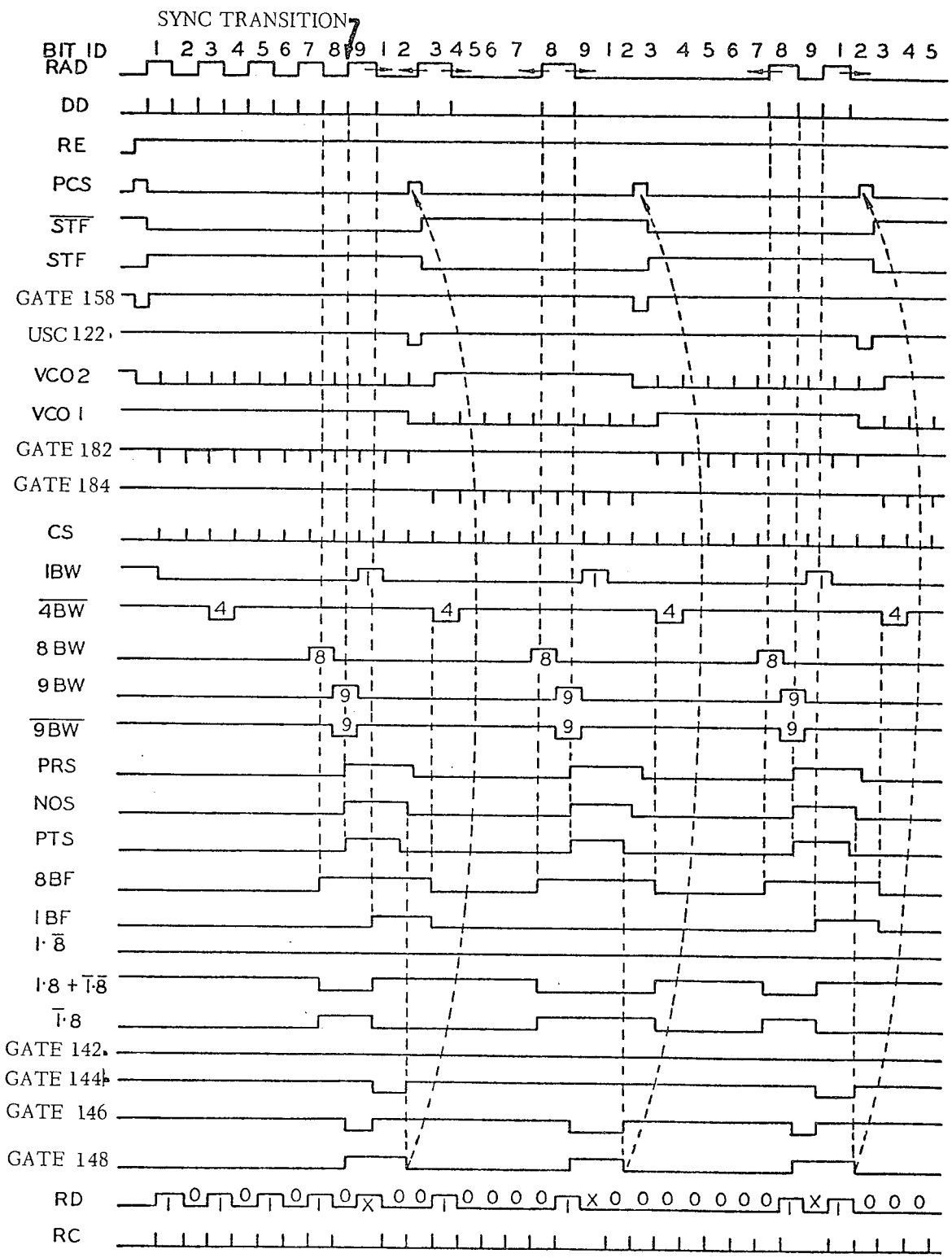
FIG. 4 is a timing diagram illustrating the operation of the circuit of FIG. 3; and, FIG. 5 is a simplified logic table illustrating the various bit transition patterns and the compensation delays introduced by the circuit of FIG. 3 according to the transition pattern.

Looking now to FIG. 3, the operation of the read circuit illustrated therein will be described with reference to the interrupted data train RAD containing the guaranteed sync transition X, as illustrated in FIG. 4. As will be hereinafter described in detail, the principal functions of the circuit of FIG. 3 are to provide a synchronized read clock signal (RC) for the reading of the data cells in the bulk recording medium, the effective elimination of the guaranteed sync transition in the final output data train, and the compensation for any shift in the guaranteed sync transition so that each periodically resynchronized series of read clock signals occurs in the proper time relationship to the actual data.

Referring more specifically to the circuit diagram of FIG. 3, the NRZ data with the guaranteed sync transition after each group of eight data cells is detected by conventional read head and read amplifier circuitry and applied to the circuit of FIG. 3 by means of lines 100 and 102. The signal sequence read from the memory is identified in FIGS. 3 and 4 as RAD and its complement $\overline{RAD}$. This signal corresponds the written sequence of flux transitions identified in FIGS. 1 and 2 as WAD and $\overline{WAD}$ which, as previously described, is the signal sequence applied to the conventional write amplifier and write head. The only differences between WAD and RAD are due to transition shifting in the recording medium. The actual implementation of the read and write heads and associated drive amplifiers has been omitted from this description because of its conventionality.

The signal sequence read from memory is applied by way of lines 100 and 102 to a differentiator circuit 104 which provides an output consisting of a series of spike-like pulses each pulse corresponding in time to a flux transition in the input waveform. The differentiated output is applied to a circuit section 106 which provides short, normal and long time delays between the occurrence of the sync pulse in the read sequence and the start of the next clock timing sequence in accordance with the need for compensation indicated by the flux transition pattern immediately surrounding the sync transition. The acual selection of the appropriate dely, either short, normal or long is made by circuit section 108 which also is connected to receive the differentiated output of the read data differentiator 104. The circuit section 108 includes a transition pattern decoder 110, described in greater detail in FIG. 3a, the outputs of which are connected back into the delay circuit section 106 to accomplish the desired end result as hereinafter described in greater detail.

The read data signal on lines 100 and 102 are also applied to an output flip-flop 112 having complementary output lines 114 and 116. The timing for the switching of flip-flop 112 is controlled by circuit section 118 which includes voltage controlled oscillators 120 and 122. These oscillators are alternatingly actuated to provide the necessary nine-bit read clock sequences. The start time of each of these sequences is adjusted by the particular delay from circuit section 106 which is selected by the circuit section 108 in response to the input flux transition pattern. Accordingly, the RD and $\overline{RD}$ outputs on lines 114 and 116 correspond with the RAD and $\overline{RAD}$ signals on lines 100 and 102 from the read head amplifier as indicated in FIG. 4, except that the transition migration effect evident in the RAD signal of FIG. 4 is eliminated from the RD signal by the operation of the circuitry of FIG. 3.

The other fundamentally important output signal from the circuit of FIG. 3 is the read clock (RC) signal appearing on line 124 and which is also illustrated on the bottom line of FIG. 4. The read clock (RC) signal is generated in AND gate 126 by the combination of the circuit section 118 which, as previously described, generates the basic read timing signals, and the $\overline{9BW}$ signal on line 128 which is generated by the nine-bit ring counter 18 of FIG. 1 during the read operation. At this point it should be recalled that the circuit of FIG. 1 is employed both during read and write operations and that the signals appearing on lines 42, 56, 58, 60, and 62 are connected directly into the circuit of FIG. 3. The $\overline{9BW}$ signal operates in combination with the AND gate 126 to delete every ninth read clock pulse as is evident in FIG. 4, the deleted clock pulse being that pulse which corresponds with the occurrence of the sync transition in the RD signal sequence. Accordingly, when the RD and RC signals are applied to the controller 24 during a read operation, the combination of the two signals is effective to automatically delete the sync transition from the output data sequence.

Referring more specifically to the circuit of FIG. 3 and also to the detailed waveform timing diagram of FIG. 4, it can be seen that the series of pulses from the differentiator 104 representing flux transitions in the read amplifier output RAD and $\overline{RAD}$ is applied to a group of AND gates 124, 126, and 128 in the circuit section 106 by way of line 130. In addition, the AND gates 124, 126, and 128 are connected to receive the 9BW timing pulse which appears on line 62 of the nine-bit ring counter 18 in the circuit of FIG. 1. This combination of signals, thus, is effective to apply the differentiated pulse representing the sync transition to each of the three voltage controlled delay devices 134, 136, and 138. The voltage controlled delay devices 134, 136, and 138 are preferably implemented in the form of one-shot multivibrators having short, medium, and long output pulse times, respectively. The voltage-controlled aspect of these devices is significant only in that the variable amplitude dc output signal of a bit clock rate tachometer 140 is commonly connected to the devices 134, 136, and 138 to proportionately vary each delay in accordance with the rate of rotation of the drum or disc memory. This speed signal from tachometer 140 is also applied to the voltage-controlled oscillators 120 and 122 of the circuit section 118, as illustrated in FIG. 3, so as to proportionately affect all of the timing factors in the circuit of FIG. 3 in accordance with the rotational speed of the physical storage medium.

The long, medium, and short term pulses from the delay devices 134, 136, and 138 represent read clock sequence advance, normal, and delay functions, respectively, and are applied to NAND gates 142, 144, and 146 which operate under the control of circuit section 108 to select the appropriate timing compensation in accordance with the transition pattern recognized and decoded by decoder 110. Gates 142, 144, and 146, thus, operate in combination with the circuit section 108 to carry out the transition migration compensation technique of the present invention. The selected delay time from the NAND gates 142, 144, and 146 is directed through the NOR gate 148 to a fixed delay device 150 the output of which is connected by way of line 152 to the input of a flip-flop 154 and the circuit section 118. Flip-flop 154, when enabled by the read enable (RE) signal, simply toggles back and forth to select first voltage controlled oscillator 120 and then voltage controlled oscillator 122 to initiate the nine-bit read clock sequence. The initiation point for each sequence is set by the occurrence in time of the sync transition as compensated by the transition pattern analysis and delay selection process. NAND gates 156 and 158 operate in combination with the flip-flop 154 and the PCS signal from delay device 150 to perform the process of alternately actuating the voltage controlled oscillators 120 and 122.

Looking back to the transition pattern analysis technique which is carried out by the circuit portion 108 of FIG. 3, it can be seen that the series of differentiated flux transition pulses from differentiator 104 are applied to flip-flops 160 and 162. In addition, flip-flop 160 is connected to receive as a timing signal the 1BW pulse which is generated on output line 56 of the nine-bit ring counter 18 in the circuit of FIG. 1. In a similar fashion, the 8BW pulse on line 60 is applied to the input of flip-flop 162 to operate as a basic timing signal. The result is that the outputs 1BF and $\overline{1BF}$ from flip-flop 160 advises the decoder 110 whether or not a flux transition occurred during the first data cell; that is, the data cell immediately following the sync transition, and the 8BF and $\overline{8BF}$ signals from flip-flop 162 advise the decoder 110 whether a flux transition occurred during the eighth data cell; that is, the data cell immediately preceding the guaranteed flux transition for sync purposes. Both flip-flops 160 and 162 are reset by the $\overline{4BW}$ signal appearing on line 58 which is numbered to correspond with the appropriate output line in the nine-bit ring counter 18 in the circuit of FIG. 1.

Figure 5:
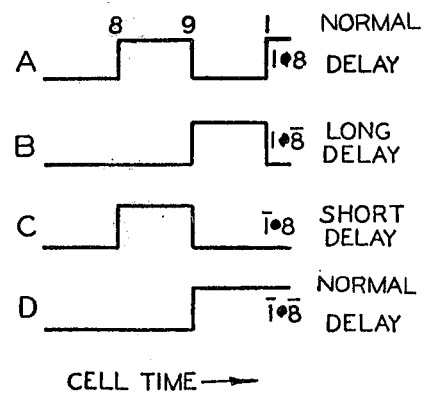

The decoder 110 in the circuit section 108 responds to the pattern of flux transitions in the sync bit cell and the first and eighth data bit cells to select a delay in accordance with the table of FIG. 5. If, as indicated on line 164 of FIG. 3 and in line B of FIG. 5, a transition occurs in the first data bit cell but not in the eighth data bit cell, gate 142 is enabled to select the long delay of delay device 134. This is based on the assumption that the pattern of transition indicated in line B of FIG. 5 causes the sync transition to migrate to the left from its proper position. A failure to introduce the long delay would result in each of the read clock pulses in the next read clock sequence occurring too early and, thus, giving rise to a read data error possibility. If, as indicated on line 166 of FIG. 3 and on line A of FIG. 5, transitions occur both in the eighth and first data cells, gate 144 is enabled to select the normal or medium length delay represented by device 136. The reasoning for this case is that the transitions on opposite sides of the sync transition illustrated in line A of FIG. 5 have equal and counterbalancing effects on the position of the sync transition and, accordingly, no compensation is necessary. A similar situation exists where, as illustrated on line D of FIG. 5 and as indicated again on line 166 of FIG. 3, no transition occurs either before or after the guaranteed sync transition. In this case, no significant migration in the position of the sync transition is likely to occur and again no compensation is necessary. Thus, output line 166 from decoder 110 represents two conditions which do not require compensation and enables gate 144 to select the normal delay time. The third and last case is represented on line 168 of FIG. 3 and on line C of FIG. 5 wherein a transition occurs in the eighth data cell, but no transition occurs in the first data cell immediately following the sync transition. In this case, the signal on line 168 enables gate 146 to select a short delay time from device 138 to effectively advance the read pulses in the next clock sequence. As illustrated in FIG. 5, line C, the transition in the eighth data cell produces a migration of the sync transition to the right, that is, toward the first data cell position. Accordingly, the short delay operates to produce the effect of negating the sync transition migration caused by the crowding of pulses in the magnetic storage medium.

The decoder 110 may be straightforwardly implemented using well known logic elements, as illustrated in FIG. 3a. In FIG. 3a, all NAND gates are used, however, it will be appreciated by those skilled in logic circuit synthesis that other types of gates can be employed to accomplish the same end result. In FIG. 3a, gate 170 is connected to receive the 1BF and $\overline{8BF}$ signals whereas gate 172 is connected to receive the 8BF and $\overline{1BF}$ signals from the flip-flops 160 and 162 of FIG. 3. The output of gate 170 is connected to the input of gate 174 which selects the long delay and the gate 176 which operates to select the normal delay under the proper condition. Similarly, the output of gate 172 is connected to gate 176 and also to gate 178 to select the short delay time. The output of gate 176 which is enabled only when the conditions represented by lines A and D of FIG. 5 are satisfied is connected to gate 180 to produce the normal delay time selection previously described.

Looking again to FIG. 3, the STF output of flip-flop 154 is connected to the inputs of NAND gates 156 and 182 whereas the $\overline{STF}$ output is connected to NAND gates 158 and 184, this cross connection being effective to select the voltage controlled oscillators 120 and 122 in alternating fashion. The outputs of the gates 182 and 184 are connected through the NOR gate 186 to the input of gate 126 and also to the input of output flip-flop 112 to control the timing of the data train RD and the read clock pulses RC on line 124. As previously described, the gate 126 operates to delete the read clock pulse which corresponds to the sync transition, thus, to effectively eliminate the sync transition from the final output data representation which is presented to the controller.

OPERATION

Summarizing the operation of the invention as described with reference to the illustrative embodiments of FIGS. 1 through 5, data is recorded in a magnetic medium in an NRZ code which is interrupted after each sequence of eight data cells by the occurrence of a guaranteed flux transition for read syncronization purposes. This is carried out in the circuit of FIG. 1 through the use of a nine-bit ring counter 18 which inserts the guaranteed flux transition by way of the write output flip-flop 28. The resulting data sequence is represented by the WAD signal waveform of FIG. 2 and is applied to the write amplifier for direct recording into the magnetic medium.

During readout, the circuit of FIG. 3 in combination with the appropriate portions of the circuit of FIG. 1, operates to decode the waveform RAD from the read amplifier to recover the data read from memory and to eliminate the guaranteed flux transition which has no data value. This is accomplished by generating a read clock signal (RC) in which the read clock pulse corresponding to the guaranteed flux transition is deleted and also by generating a compensated read data waveform RD in which the effects of transition migration due to pulse crowding have been substantially eliminated.

In the circuit of FIG. 3 the waveform RAD from the read amplifier is differentiated to provide pulses representing the flux transitions in the RAD waveform. The pulse representing the sync transition is applied to circuit section 106 to select one of three possible delays between the occurrence of the sync transition and the start of the next read clock sequence. The pulse representing the sync transition is applied along with the pulses representing the data transitions in the first and eighth data cell positions to circuit section 108 which contains decoder 110. This decoder operates to analyze the transition pattern in accordance with the table of FIG. 5 and to select one of the three delays either long, normal, or short to compensate for the physical migration of the sync transition in the magnetic recording medium. If the sync transition is presumed to have shifted so as to result in a delay, the short delay is selected for compensation; if the sync transition is presumed to have occurred early, a long delay is selected for compensation; if the sync transition has not shifted, the normal or medium delay is selected. In any event, the transition occurrence signal, after compensation as necessary, is applied to circuit section 118 which generates the read clock pulses and which toggles the output flip-flop 112 in accordance with the data pattern from the read amplifier. Gate 126 operates to delete every ninth read clock pulse such that when the combination of the RD signal from output flip-flop 112 and the RC signal from gate 126 is applied to the controller, the flux transition in the RD waveform is effectively deleted.

It will be understood that the foregoing description of the invention is is illustrative in nature, particularly with respect to circuit details, and is not to be construed in a limiting sense.

The embodiments of the invention in which an exclusive property or privilege is claimed are defined as follows:

1. In a data storage system of the type wherein data is stored in a bulk medium according to a binary code in which opposite bit values are represented in bit cells by respective levels and wherein the sync transition occurs every n data bit cells: a readout system comprising clock means responsive to the occurrence of a sync transition for generating a sequence of timing signals representing the position in time of successive data cells being read, means for reading the bit values in the successive bit cells, means for counting the successive bit cells to identify each occurrence of $n$ data bit cells, and compensation means responsive to particular patterns of the level transitions associated with the data cells preceding and following each identified sync transition of $n$ data bit cells for adjusting the time relationship between the sync transition and said sequence of reading the bit values in the successive bit cells in accordance with such particular patterns to compensate for shifting of said sync transition as read from said medium by said readout system.

2. Apparatus as set forth in claim 1 wherein means are included for comparing the characteristics of the signals read out by the readout system at the bit cells immediately preceding and immediately following each sync transition of n data bit cells, and means are responsive to the signals from the comparing means, in accordance with each comparison, for adjusting the time for reading the data bits after the sync transition of $n$ data bit cells.

3. In a magnetic data storage system of the type wherein data is stored in a bulk medium according to a binary code in which opposite bit values are represented in bit cells by respective flux levels and wherein the sync flux transition occurs every $n$ data bit cells: a readout system comprising clock means responsive to the occurrence of a sync transition for generating a sequence of time signals representing the position in time of successive data cells being read, and compensation means responsive to the flux level transitions associated with the data cells preceding and following the sync transition for adjusting the time relationship between the sync transition and said sequence to compensate for shifting of said sync transition in said medium, the compensation means comprising a plurality of delay means having inputs connected to receive said sync flux transitions and outputs connected to said clock means and representing respective time delays, decoder means responsive to data and sync transitions for producing output signals representing sync transition shifts, and logic means responsive to the output signal from said decoder means to operatively connect one of said plurality of delay means in operative input relationship with said clock means to select a time delay for compensation of the sync transition shift.

4. Apparatus as defined in claim 3 wherein the delay means include a first delay of median time, a second delay of a time longer than said median, and a third delay of a time shorter than said median.

5. Apparatus as defined in claim 4 wherein said decoder means includes inputs responsive only to the sync transition and the data transitions corresponding to the data cells immediately preceding and following the sync transition.

6. Apparatus as defined in claim 4 including means for proportionately varying all of the delay times of said first, second, and third delays according to memory medium displacement rate.

7. Apparatus as defined in claim 5 wherein said clock means includes a first oscillator, and input means for resetting the oscillator, said delay means being connected to said input means for resetting the oscillator after each of said sync transitions.

8. Apparatus as defined in claim 7 wherein said clock means includes a second oscillator, an output gate, and means for alternatingly connecting the first and second oscillators to the output gate.

9. In combination for use with apparatus for storing bit values in bit cells wherein changes in bit values are represented by changes in voltage levels and wherein a sync transition is provided every $n$ bit cells, first means for reading the voltage levels to reproduce the bit values, second means for counting the bit cells to produce a signal indicating each sync transition of $n$ bit cells, third means responsive to the operation of the first and second means for producing clock signals to synchronize the operation of the first and second means, and fourth means responsive to the bit values read by the first means in the bit cells immediately preceding and immediately following each signal produced by the second means for adjusting the time for the production by the third means of the clock signals in accordance with the relative bit values in such immediately preceding and immediately following bit cells.

10. In the combination set forth in claim 9, the fourth means including a decoder for adjusting the time for the production by the third means for the clock signals when the bit value for the immediately preceding bit cell is different from the bit value for the immediately following bit cell.

11. In the combination set forth in claim 10, the fourth means including logical circuitry for providing for an increase in the delay for the production by the third means of the clock signals when the first means reads a change in the voltage level in the immediately following bit cell.

12. In the combination set forth in claim 10, the fourth means including logical circuitry for providing for a decrease in the delay for the production by the third means of the clock signals when the first means reads a change in the voltage level in the immediately preceding bit cell.

13. In the combination set forth in claim 9, means for providing for an adjusting in the time for reading the bit values for the bit cells and means responsive to a comparision between the bit values for the bit cells immediately preceding and immediately following each sync transition of $n$ bit cells for energizing the adjusting means to adjust the time for reading the bit values for the data cells.

14. In the combination set forth in claim 13, the clock means including oscillator means and the fourth means including means responsive to the energizing of the adjusting means for resetting the oscillator means after each of the sync transitions in accordance with the adjustments provided in the adjusting means.

* * * * *